Nov. 30, 1926.

D'ORSAY McC. WHITE

VEHICLE WHEEL

Filed Sept. 21, 1925

1,608,687

INVENTOR
D'ORSAY McCALL WHITE
BY
ATTORNEY

Patented Nov. 30, 1926.

1,608,687

UNITED STATES PATENT OFFICE.

D'ORSAY McCALL WHITE, OF CHICAGO, ILLINOIS, ASSIGNOR TO MOTOR INDUSTRIES, INC., OF CHICAGO, ILLINOIS, A CORPORATION OF ILLINOIS.

VEHICLE WHEEL.

Application filed September 21, 1925. Serial No. 57,598.

This invention relates to vehicle wheels, and is illustrated as embodied in a rear disk wheel for an automobile. An object of the invention is to provide a strong and inexpensive wheel, preferably with the inflating means of the tire accessible from the outer side of the wheel.

In one desirable arrangement an inner part, shown as a brake drum, is formed with a radial pocket, or with a series of such pockets constituting radial strengthening corrugations, the pocket or corrugations being bridged by an outer annulus serving to complete the wheel disk. I prefer that the valve stem of the tire carried by this annulus should extend into the radial pocket, or into one of the corrugations, and that it should project beyond the inner edge of the annulus so that it is accessible from the outer side of the wheel.

These and other features of the invention, including various desirable and novel particular constructions, will be apparent from the following description of the illustrative embodiment shown in the accompanying drawing, in which.

Figure 1:
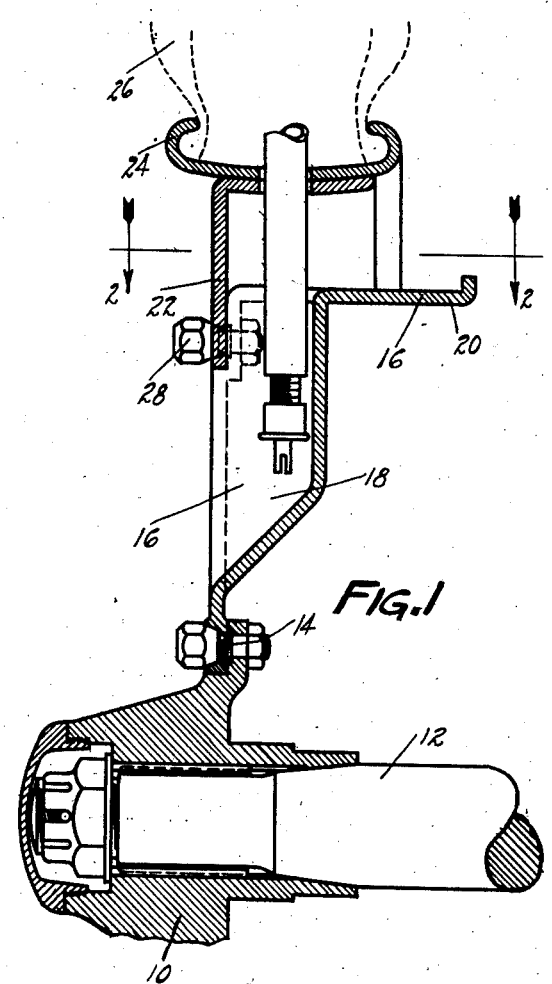
Fig. 1 is a radial section through one half of the wheel.
Figure 2:
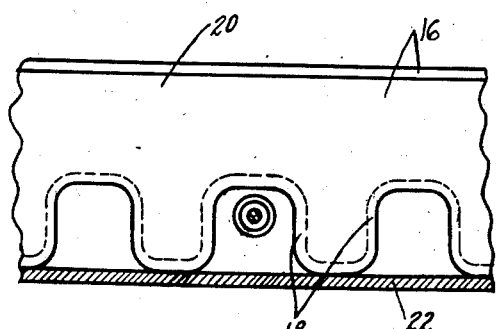
Fig. 2 is a partial section on the line 2—2 of Fig. 1, showing the outside of the brake drum.

The wheel selected for illustration comprises a driving hub 10 splined on the drive axle 12, and to which is shown detachably connected by bolts 14 the inner wheel disk part, which is preferably a brake drum 16.

The brake drum has a pocket 18, or a series of such pockets forming radially-extending corrugations, at its outer edge, serving to strengthen the drum, and also serving to space the cylindrical braking flange 20 of the drum inwardly in the position it would occupy with a wood wheel.

The pockets or corrugations 18 are bridged by an annulus 22, serving as a disk-completing member carrying a rim 24 and tire 26. Annulus 22 rests at its inner edge on rabbeted shoulders formed in the projections between the corrugations, and is demountably secured to those projections by bolts and nuts 28.

According to an important feature of the invention, the valve stem 30 of the tire 26 extends into its pocket 18 radially inward beyond the inner edge of annulus 22, so that it is accessible from the outer side of the wheel. This is especially useful with balloon tires, where the brake drum is nearly as large as the wheel, and annulus 22 is a very narrow ring.

While one illustrative embodiment has been described in detail, it is not my intention to limit the scope of the invention to that particular embodiment, or otherwise than by the terms of the appended claims.

I claim:

1. A wheel having, in combination, a brake drum having a braking flange at its outer edge and formed with a pocket in its outer side, an annulus secured to the drum and bridging the pocket, and a tire carried by the annulus having a valve stem projecting into the pocket beyond the inner edge of the annulus and accessible from the outer side of the wheel.

2. A wheel having, in combination, a brake drum having radially-extending corrugations, an annulus secured to the drum and bridging the corrugations, and a tire carried by the annulus having a valve stem projecting into one of the corrugations beyond the inner edge of the annulus and accessible from the outer side of the wheel.

3. A wheel having, in combination, a brake drum having radially-extending corrugations, a rim-carrying member bridging the corrugations, and a tire carried by said member having a valve stem projecting into one of the corrugations and accessible from the outer side of the wheel.

4. A wheel having, in combination, an inner part having radial corrugations at its outer edge, an annulus secured to said part and bridging the corrugations, and a tire carried by the annulus and having a valve stem extending into one of the corrugations and projecting radially inward beyond the innter edge of the annulus to be accessible from the outer side of the wheel.

5. A wheel having, in combination, an inner part having a pocket at its outer edge, an annulus secured to said part and bridging the pocket, and a tire carried by the annulus and having a valve stem extending into the pocket and projecting radially inward beyond the inner edge of the annulus to be accessible from the outer side of the wheel.

6. A wheel having, in combination, an inner part having a pocket at its outer edge, an annulus secured to said part and bridging the pocket, and a tire carried by the annulus and having a valve stem extending into the pocket.

7. A wheel having, in combination, a brake drum having radial corrugations at its outer edge, and an outer annulus completing the wheel disk and secured to the drum and bridging the corrugations.

8. A wheel having, in combination, a brake drum having a radial pocket at its outer edge, and an outer annulus completing the wheel disk and secured to the drum and bridging the pocket.

9. A wheel having, in combination, a brake drum having a braking flange at its outer edge and formed with parts projecting axially outward a substantial distance from the braking flange, and a disk-completing annulus secured to the projecting parts at a substantial distance radially from the wheel axis.

In testimony whereof I have hereunto signed my name.

D'ORSAY McCALL WHITE.